April 20, 1943.                R. E. RISLEY                2,316,974
                               SADDLE GASKET
                            Filed Dec. 2, 1941              2 Sheets-Sheet 1

INVENTOR
Roger E. Risley
BY
Louis Prevost Whitaker
ATTORNEY

April 20, 1943.  R. E. RISLEY  2,316,974
SADDLE GASKET
Filed Dec. 2, 1941  2 Sheets-Sheet 2
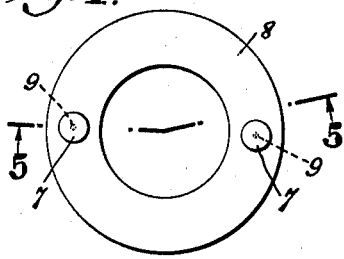
Fig. 4.
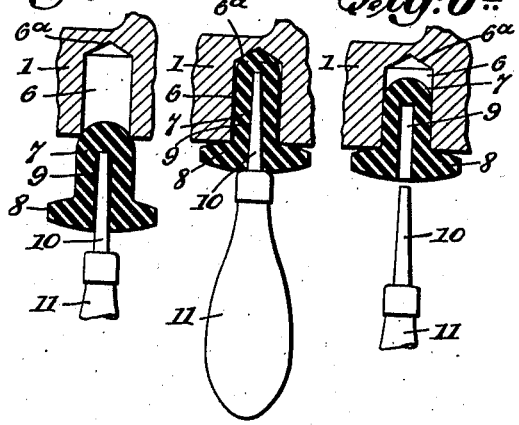
Fig. 6.  Fig. 6b.
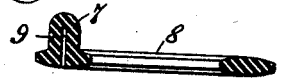
Fig. 5.
Fig. 6a.
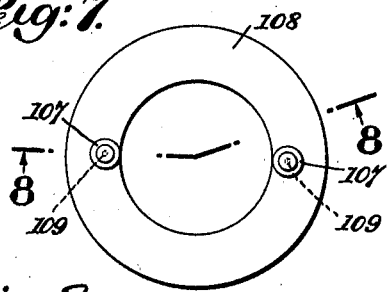
Fig. 7.
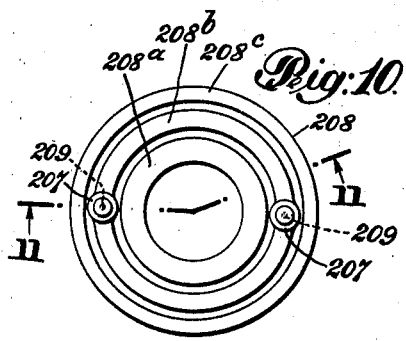
Fig. 10.
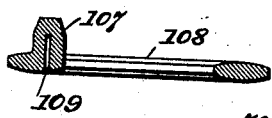
Fig. 8.
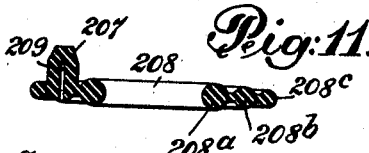
Fig. 11.
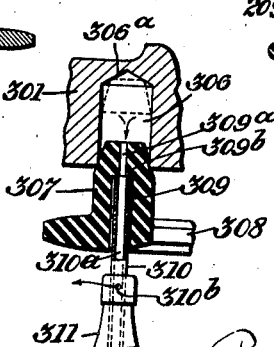
Fig. 9.
INVENTOR
Roger E. Risley
Louis Prescott Whitaker
ATTORNEY Patented Apr. 20, 1943

2,316,974

UNITED STATES PATENT OFFICE 2,316,974

SADDLE GASKET

Roger E. Risley, Bradford, Pa., assignor to Dresser Manufacturing Company, Bradford, Pa., a corporation of Pennsylvania Application December 2, 1941, Serial No. 421,266

5 Claims. (Cl. 285—108)

My invention consists in the novel features hereinafter described reference being had to the accompanying drawings which illustrate one embodiment of the invention and several slight modifications thereof, and the said invention is fully disclosed in the following description and claims.

In the use of pipe saddles, it has been customary to employ gaskets of lead between the saddle flange and the outer surface of the pipe, the lead being compressed when the nuts on the threaded ends of the stirrups are tightened. These metallic gaskets have not proved entirely satisfactory, and at the present time gaskets of rubber or rubber composition are preferred. In practice, rubber gaskets in the form of flat rings are usually furnished separately from the metal flange and stirrups, and provided by the user by cutting them from sheet material. As a result, gaskets may become mislaid or lost, or an incorrect sized gasket may be improperly placed with respect to the branch pipe aperture in the saddle flange, with the result that the desired gas tight connection between the flange and pipe to which it is applied is not obtained, and in some cases partial closing of the pipe aperture may be produced.

The object of my invention is to provide a saddle with a gasket of rubber or rubber composition which can be attached to and furnished with the metallic parts of the saddle, and which will be held substantially permanently in place coaxially with respect to the branch pipe aperture in the saddle flange.

In the preferred form of my invention, I provide the molded gasket of elastic material, preferably rubber or rubber composition, with at least two projections or ears disposed substantially perpendicularly to the plane of the gasket, and arranged to effect such a tight fit with the walls of properly located apertures or sockets, in the saddle flange, and closed at their inner ends that the gasket cannot be separated from the saddle flange without the exertion of considerable force. It is important to provide these sockets closed at their inner ends, as the gaskets are ordinarily narrow, and if apertures extending entirely through the saddle flange were employed, the sealing surface adjacent to the projections or ears would be materially reduced, and leakage through these apertures might easily occur. It is also desirable that the ears should be of greater diameter than the sockets to make it practically impossible for the gasket to accidentally separate from the saddle flange. When so made it is extremely difficult to insert the ears in the sockets as the ears or projections tend to bind therein and further they act like pistons in compressing the air in the sockets so as to resist the insertion of the ears.

I overcome these difficulties in several ways. For example, I may provide each of the projections or ears with a longitudinal passage closed at its outer end, to receive a small elongating pin or rod, which is inserted in the passage so that the projection may be extended longitudinally, thereby reducing its diameter to less than that of the socket in which it is to be inserted, thus enabling the projection or ear to be readily inserted, as the occluded air can escape between the projection and the wall of the socket. When the pin is withdrawn the projection or ear will contract longitudinally and expand laterally so as to firmly fit the socket and make its accidental removal practically impossible. The exterior surface of the ears may be coated with cement if desired, which will make it practically impossible to remove them from the sockets, but I prefer not to use cement, as it is sometimes desirable to remove the gasket and replace it. It can be readily removed by again inserting the pins and stretching the ears longitudinally, and thereby reducing their diameter and permitting them to be drawn out. The sockets are preferably of slightly greater length than the ears to facilitate the insertion and removal of the ears.

By this means the gasket can be united to the flange of the saddle before delivery to the user and will be held in concentric position with respect to the branch pipe aperture and retained in operative relation with the saddle.

In some instances I may provide the ears with longitudinal passages open at their inner ends and provide the inserting pins with longitudinal outlet passages communicating with the atmosphere, to facilitate exhausting the air from the sockets. My invention also contemplates other modifications hereinafter described and illustrated in the accompanying drawings.

Referring to said drawings,

Fig. 4 is a plan view of the saddle gasket.

Fig. 5 represents a section of the same on the line 5—5 of Fig. 4.

Fig. 6 is a detail view showing the manner of inserting the ears of the gasket in the sockets provided in the saddle flange.

Fig. 6a is a similar view showing the gasket elongated and inserted within the socket.

Fig. 6b is a similar view showing the elongating pin or rod removed and the gasket ear firmly seated in the socket.

Fig. 7 is a plan view similar to Fig. 4, showing a slightly modified construction.

Fig. 8 is a sectional view on the line 8—8 of Fig. 7.

Fig. 9 is a view similar to Fig. 6, showing a slightly modified construction.

Fig. 10 is a plan view of a slightly modified form of gasket.

Fig. 11 is a sectional view on the line 11—11 of Fig. 10.

Figure 1:
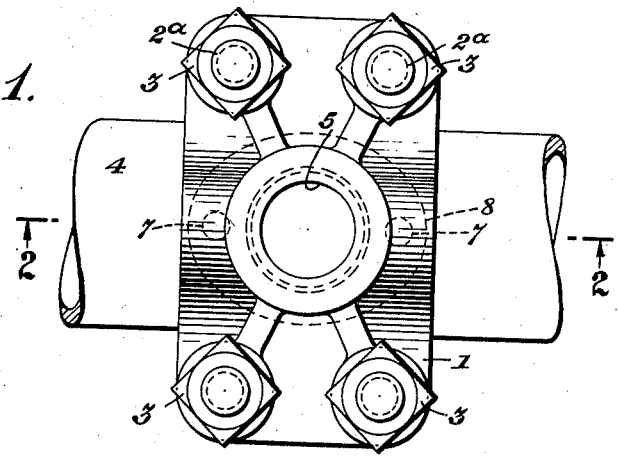
Fig. 1 is a plan view of a saddle and its engaged pipe section, the gasket being indicated in dotted lines.

In the drawings, Figs. 1 to 6, 1 represents the saddle flange which may be of any preferred or usual construction, and is provided at each end with bolt apertures to receive the threaded ends 2a of the saddle stirrups 2. 3 represents the nuts for clamping the saddle flange upon the pipe, indicated at 4. The saddle flange 1 is provided with a branch aperture 5, shown in this case threaded to receive a threaded branch pipe, and this saddle flange is also provided, preferably at points diametrically opposite each other and on opposite sides of the aperture 5, with sockets 6—6 closed at their ends, as at 6a, 6a, to receive projections or ears 7, formed integral with a circular gasket 8, formed of elastic material, preferably rubber or rubber composition. The gasket 8 is also provided with a channel, indicated at 9, extending longitudinally of each of the ears or projections 7, from the bottom face of the gasket to a point near the upper end of the ear.

As previously set forth, each of the ears or projections 7 is formed of greater diameter than that of the socket 6 which it is to engage, as clearly indicated in Fig. 6.

In Figs. 6, 6a and 6b I have shown the manner in which the elastic projections or ears are inserted in the sockets 6. Thus, in Fig. 6, I have shown an elongating pin or rod 10, which may conveniently be provided with a handle 11, and which is preferably slightly tapered toward its outer end, inserted in the central channel 9 of the ear or projection 7, so that by pressure of the said pin or rod, the projection or ear may be elongated, as shown in Fig. 6a, thereby reducing its diameter so that it is less than the diameter of the socket 6, and thus permitting the insertion of the projection or ear in the socket and allowing the occluded air within the socket alongside of the ear and between its outer surface and the inner surface of the socket, to pass to the atmosphere. To facilitate this operation the socket is formed with a slightly greater depth than the length of the ear or projection.

In Fig. 6b the pin is removed from the channel 9 in the ear or projection, permitting the longitudinal contraction thereof, which will cause it to expand laterally and firmly engage the wall so that it cannot be accidentally disengaged therefrom.

In the form of my invention indicated in Figs. 1 to 6a, for example, the ears or projections, substantially centrally with respect to the width of the annular portions of the gasket and the opposite faces of the gasket, are preferably formed of greater thickness, so that when the gasket is placed under compression by tightening the nuts 3—3 of the saddle stirrups, the gasket will be compressed first at its thickest portion and the packing surfaces on opposite sides of the gasket will be forced gradually into greater area of contact, until the desired and efficient packing results.

In some instances the projections or ears may be located more closely adjacent to either the inner or the outer periphery of the gasket for example, and in Fig. 8 I have shown the gasket at 108 having the ears or projections 107 located closely adjacent to the inner peripheral edge of the gasket, and with the upper or outer ends of the ears chamfered instead of rounded, as shown in the previous figures.

In Figs. 10 and 11 I have shown another slight modification of the gasket, in which the body of the gasket is formed of a plurality of concentric rings 208a, 208b and 208c, diminishing in cross sectional diameter toward the outer periphery of the gaskets, these rings being connected by relatively thin webs to form an integral gasket of rubber or rubber composition, or other suitable elastic material. This provides a concentric series of high pressure areas, the initial seal being made at the innermost ring section and subsequent tightening of the stirrups applying pressure progressively to the other ring sections. This form of gasket is of advantage in providing for a variation in curvature between the saddle and the pipe, and for accommodating irregularities in the meeting surfaces of the saddle flange and pipe, which functions are also served by the form of gasket section illustrated in the preceding figures.

In Fig. 9 I have illustrated another slight modification of my invention in which the longitudinal channels 309 in the projections or ears 307 are open at the outer end, through a passage 309a, which is of less diameter than the channel 309. This will provide a shoulder 309b at the inner end of the channel 309 to be engaged by the elongating pin 310, and I further provide the pin itself with a longitudinal passage 310a communicating by a lateral aperture 310b with the atmosphere to facilitate the discharge of the occluded air within the sockets as the ears or projections are elongated and forced into the latter.

Figure 2:
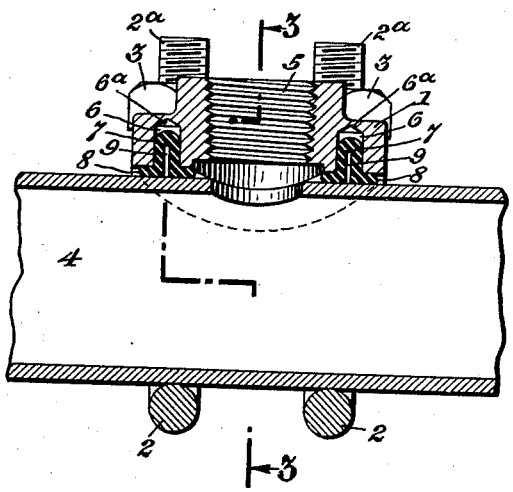
Fig. 2 is a section of Fig. 1 on line 2—2 thereof.
Figure 3:
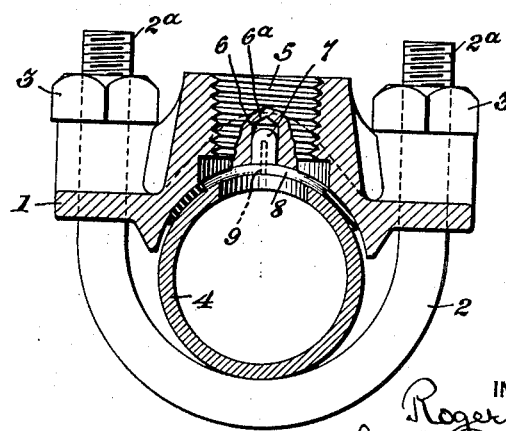
Fig. 3 is a section on line 3—3 of Fig. 2, a portion being broken away to show the interengagement of the gasket ears with the sockets in the saddle flange.

It will be noted by reference particularly to Fig. 2, for example, that by having the sockets 6 for the ears or projections 7 closed at their inner ends, it is possible to form the gasket of a diameter but slightly larger than the branch aperture 5 in the saddle flange and to locate the ears directly on the packing surfaces of the gasket, and to thus reduce the size of the gasket without impairing its efficiency. On the other hand, it will also be seen from this figure, that where the sockets 6 open at their outer ends the area of effective packing adjacent to the ears or projections 7 would be reduced to less than half the width of the annular portion of the gasket.

Since the gasket is preferably made quite narrow throughout its annular portion to insure a high gasket pressure, the materiality of closing the sockets 6 at their outer ends will be immediately apparent. It will also be obvious that the location of the ears or projections with respect to the inner and outer peripheral edges of the gasket may be varied to enable the sockets or recesses 6 to be drilled or otherwise formed in the saddle flange at points where they may be drilled to sufficient depth without penetrating entirely through the casting or body of the flange.

What I claim and desire to secure by Letters Patent is:

1. The combination with a saddle having a saddle flange provided with sockets closed at their outer ends and disposed laterally with respect to the branch pipe aperture therein, and a gasket of elastic material having integral ears of greater diameter than that of said sockets and held under lateral compression in said sockets, said ears being each provided with a longitudinal passage closed at its inner end to receive a tool for elongating it and reducing its diameter and thereby venting the occluded air in said socket.

2. The combination with a saddle having a saddle flange provided with sockets closed at their outer ends and disposed laterally with respect to the branch pipe aperture therein, and a gasket of elastic material having integral ears of greater diameter than that of said sockets and held under lateral compression in said sockets, said ears being each provided with a longitudinal passage to receive a tool to elongate it and reduce its diameter, said passage being provided at its inner end with an aperture communicating with the inner end of its engaged socket, to vent the occluded air therefrom through said passage and thereby facilitate the insertion of the ear in said socket.

3. A saddle gasket formed of elastic material and comprising an annular portion provided with integral projections extending substantially perpendicularly from one face of the gasket for engaging recesses of less diameter in the saddle flange, said projections being provided each with a longitudinal passage to receive a tool for elongating it and reducing its diameter to facilitate the insertion thereof in one of said recesses.

4. A saddle gasket formed of elastic material and comprising an annular portion provided with integral projections extending substantially perpendicularly from one face of the gasket for engaging recesses of less diameter in the saddle flange, said projections being provided each with a longitudinal passage extending therethrough and having a restricted portion at its outer end providing a shoulder to be engaged by a tool for inserting said projections in said recesses.

5. The combination with a saddle having a saddle flange provided with sockets closed at their outer ends and disposed laterally with respect to the branch pipe aperture therein, of a gasket of elastic material having integral ears normally of less length and of greater diameter than said sockets and held under lateral compression in said sockets when in assembled relation.

ROGER E. RISLEY.